United States Patent
Chen et al.

(10) Patent No.: US 8,621,495 B2
(45) Date of Patent: Dec. 31, 2013

(54) METHODS AND APPARATUS FOR SECURING FRAMES FROM OTHER FRAMES

(75) Inventors: Shuo Chen, Kenmore, WA (US); David A. Ross, Redmond, WA (US); Yi-Min Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1300 days.

(21) Appl. No.: 12/016,654

(22) Filed: Jan. 18, 2008

(65) Prior Publication Data
US 2009/0187918 A1 Jul. 23, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC ............................ 719/329; 719/313; 719/319

(58) Field of Classification Search
None
See application file for complete search history.

(56) References Cited

U.S. PATENT DOCUMENTS

| | | | | |
|---|---|---|---|---|
| 5,317,511 A * | 5/1994 | Jacobson | ...................... | 715/854 |
| 5,799,090 A * | 8/1998 | Angert | ............................. | 380/43 |
| 6,275,938 B1 | 8/2001 | Bond et al. | | |
| 6,317,868 B1 * | 11/2001 | Grimm et al. | .................. | 717/127 |
| 7,729,992 B2 * | 6/2010 | Rose | ................................ | 705/51 |
| 2002/0099952 A1 * | 7/2002 | Lambert et al. | ............... | 713/200 |
| 2003/0135504 A1 | 7/2003 | Elvanoglu et al. | | |
| 2004/0103200 A1 | 5/2004 | Ross et al. | | |
| 2004/0148514 A1 * | 7/2004 | Fee et al. | ...................... | 713/200 |
| 2004/0260754 A1 | 12/2004 | Olson et al. | | |
| 2004/0268139 A1 | 12/2004 | Christian et al. | | |
| 2006/0155780 A1 | 7/2006 | Sakairi et al. | | |
| 2006/0277218 A1 | 12/2006 | Franco et al. | | |
| 2007/0016949 A1 * | 1/2007 | Dunagan et al. | ................. | 726/22 |
| 2007/0050854 A1 | 3/2007 | Cooperstein et al. | | |
| 2007/0107057 A1 | 5/2007 | Chander et al. | | |
| 2007/0136579 A1 | 6/2007 | Levy et al. | | |
| 2007/0199050 A1 | 8/2007 | Meier | | |
| 2007/0208822 A1 | 9/2007 | Wang et al. | | |
| 2007/0214503 A1 | 9/2007 | Shulman et al. | | |
| 2007/0294682 A1 * | 12/2007 | Demetriou et al. | ........... | 717/153 |
| 2007/0299857 A1 | 12/2007 | Gwozdz et al. | | |
| 2007/0300064 A1 | 12/2007 | Isaacs et al. | | |

(Continued)

OTHER PUBLICATIONS

Performing code assist on Java code, Eclipse.org, Oct. 16, 2003. pp. 1-3.*

(Continued)

*Primary Examiner* — H S Sough
*Assistant Examiner* — Craig Dorais
(74) *Attorney, Agent, or Firm* — Lee & Hayes, PLLC

(57) ABSTRACT

A method includes placing an accent in a frame, and only letting frames with the same accent communicate with each other. This accenting is removed using an accent key immediately prior to a compilation operation. The accenting can be performed by performing an XOR operation on a data stream using a key. In one exemplary non-limiting embodiment a computing system is provided. The computing system includes a memory, and a processor coupled to the memory, the processor configured to introduce domain specificity to at least one of a script and an HTML object name. In another exemplary non-limiting embodiment, means are provided for introducing domain specificity to at least one of a script and an HTML object name and means are provided for removing the introduced domain specificity prior to a compiling operation.

18 Claims, 11 Drawing Sheets

(56) References Cited

U.S. PATENT DOCUMENTS

| | | | |
|---|---|---|---|
| 2008/0313648 | A1 | 12/2008 | Wang et al. |
| 2009/0089793 | A1* | 4/2009 | Nandagopal et al. ......... 718/105 |
| 2009/0183171 | A1 | 7/2009 | Isaacs et al. |
| 2009/0183227 | A1 | 7/2009 | Isaacs et al. |
| 2009/0299862 | A1 | 12/2009 | Fan et al. |
| 2009/0300496 | A1 | 12/2009 | Fan et al. |
| 2009/0327869 | A1 | 12/2009 | Fan et al. |
| 2010/0058293 | A1 | 3/2010 | Dunagan et al. |

OTHER PUBLICATIONS

Shuo Chen. Light-Weight Transparent Defense Against Browser Cross-Frame Attacks Using Script Accenting. Technical Report—MSR-TR-2007-29, Mar. 14, 2007. tp://ftp.research.microsoft.com/pub/tr/TR-2007-29.pdf. Last accessed OCt. 5, 2007, 16 pages.

Abe Fettig. How to make XMLHttpRequest Calls to Another Server in Your Domain. http://ajaxian.com/archives/how-to-make-xmlhtlprequest-calls-to-another-server-in-your-domain. Last accessed Oct. 5, 2007, 5 pages.

Collin Jackson, et al. Subspace: Secure Cross-Domain Communication for Web Mashups. WWW 2007, May 8-12, 2007, Banff, Alberta, Canada. ACM 9781595936547/0710005 http://www.collinjackson.corn/research/papers/fp801-jackson.pdf. Last accessed Oct. 5, 2007, 10 pages.

Content Restrictions. Version 0.9.2—Mar. 20, 2007. http://www.gerv.net/security/content-restrictions/. Last accessed Oct. 5, 2007, 3 pages.

\* cited by examiner

Cross-Frame References and the Isolation Between Frame 1 and Frame 2 (Prior Art)

Illustration of Attack 1 (Prior Art)

Illustration of Attack 2 (Prior Art)

Illustration of Attack 3 (Prior Art)

Illustration of Attack 4 (Prior Art)

Accenting/De-Accenting Script Source Code

METHODS AND APPARATUS FOR SECURING FRAMES FROM OTHER FRAMES

BACKGROUND

Typically, the information available on web sites and servers is accessed using a web browser executing on a computer. For example, a user can launch a web browser and access a web site by entering a Uniform Resource Locator (URL) of the web site into an address bar of the web browser and pressing the enter key on a keyboard or clicking a button with a mouse. The URL typically includes three pieces of information that facilitate access: a protocol (set of rules and standards for the exchange of information in computer communication) string, a domain name (often based on the name of an organization that maintains the web site), and a path to the desired document within the domain.

Web browsers can render contents originated from different Internet domains. A major consideration of web security is the appropriate enforcement of the same-origin principle: although it has never been strictly defined, this principle can be loosely interpreted as "a script originated from one Internet domain should not be able to read, manipulate or infer the contents originated from another domain", which is essentially the non-interference property in the web security context. Failures to enforce this principle result in severe security consequences, e.g., a script from an arbitrary web site can steal the user's banking information or perform unintended money transfers from the user's account. The malicious script can do almost anything that the victim user can do on the browser.

Same-origin-principle violations can be due to insufficient script-filtering of the web application on the server, or due to flaws in the browser domain-isolation mechanisms: 1) Script-filtering flaws are commonly referred to as cross-site scripting (or XSS) bugs. By exploiting these bugs, malicious scripts from attacker websites can survive the filtering and later be executed in the same security context of the authentic web application. A wealth of work in the security literature addresses prevention and defense techniques against XSS attacks. XSS is not the focus in this paper; 2) On the browser side, the same-origin-principle violations are due to the improper isolation of the contents from different domains, which is one of the biggest security problems faced by browser developers. Although at the policy-specification level, certain isolation policies still need to be standardized to support more browser functionalities while preserving security, it was found that even for a well-specified policy, the implementation of the enforcement mechanism can be surprisingly hard and error-prone. For example, the most well-known isolation policy is the cross-frame same-origin policy, which states that scripts running inside a frame of one address or site (say for example http://a.com) is not allowed to access objects inside a frame of another address or site (say for example http://b.com). Bugs in the enforcement mechanism of this seemingly simple policy have been discovered on major browsers, including Internet Explorer (IE), Firefox, Opera and Netscape Navigator.

In order to better understand the problem space, conducted was a focused study of IE's domain-isolation bugs and real attacks discovered in the past. The study shows that browser's flaws in the isolation mechanism are due to many convoluted factors, including the navigation mechanism, function aliasing, excessive expressiveness of navigation methods, the semantics of user events and IE's interactions with other system components. The exploitations of these flaws, which will be explained in detail below, are highly heterogeneous, and thus it would be very challenging to exhaustively reason about every scenario that the isolation mechanism may encounter. Of course, the unsolved challenge suggests that the browser may have new bugs of this type discovered in the future, similar to the situation that one can have with buffer overrun bugs—individual bug patches would not solve the problem as a whole.

The prevalence of browser isolation bugs in all major browser products naturally calls for a comprehensive defense technique. However, two practical constraints need to be considered when designing the defense technique: 1) the technique must be transparent to existing browser functionalities. A large volume of web applications have been developed based on existing browser functionalities. It would be a significant deployment hurdle if a defense mechanism broke these applications; 2) one may have only limited understanding of the browser implementation. Browser products have very large code bases. The comprehensiveness of the defense should only rely on the correct understanding of a small subset of the source code, and thus should be straightforward.

SUMMARY

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description later presented. Additionally, section headings used herein are provided merely for convenience and should not be taken as limiting in any way.

A method includes placing an accent in a frame, and only letting frames with the same accent communicate with each other. This accenting is removed using an accent key immediately prior to a compilation operation. The accenting can be performed by performing an XOR operation on a data stream using a key. For example, a 32 bit (four byte) key can be used to XOR against the data stream. The same key is then later used to remove the previously applied accenting by using the same accent key immediately prior to a compilation operation. If a frame is accented with one key, and the accented data is thought to have come from another frame (second frame) then when the accented data is XORed with the wrong key (belonging to the second frame) the result is a meaningless stream that cannot be compiled.

This is similar to the situation in a C program where a pointer references to a memory location that is not readable, writable or executable, and any dereference of the pointer results in a memory fault. In one exemplary non-limiting embodiment a computing system is provided. The computing system includes a memory, and a processor coupled to the memory, the processor configured to introduce domain specificity to at least one of a script and an HTML object name. In another exemplary non-limiting embodiment, means are provided for introducing domain specificity to at least one of a script and an HTML object name and means are provided for removing the introduced domain specificity prior to a compiling operation.

The disclosed and described components and methods comprise one or more of the features hereinafter described and particularly pointed out in the claims. The following description and the annexed drawings set forth in detail certain specific illustrative components and methods. However, these components and methods are indicative of but a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

DETAILED DESCRIPTION

Figure 1:
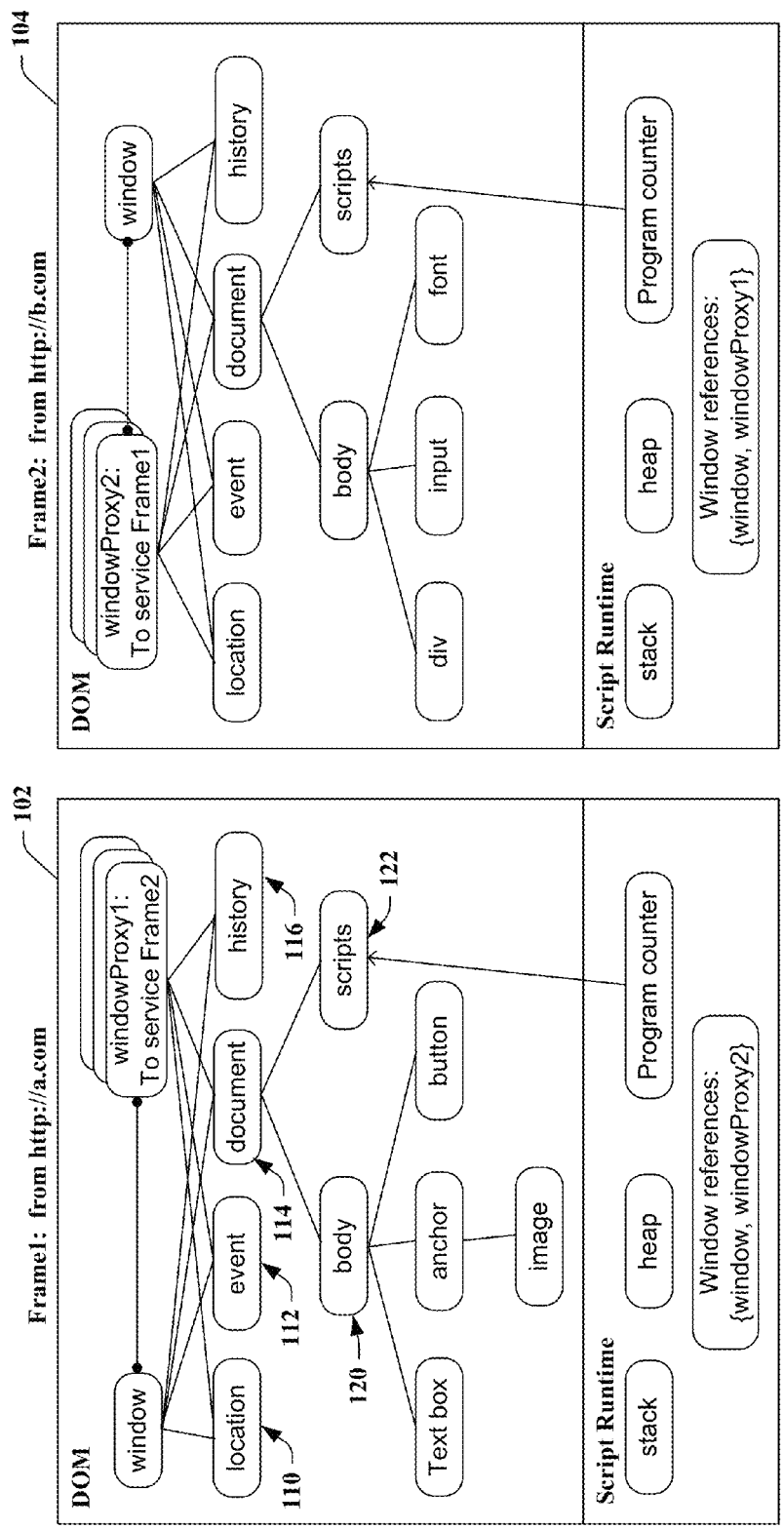
FIG. 1 illustrates a cross-frame references and the isolation between frame 1 and frame 2.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

The disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

It should be noted that as used herein, the term web page can be interchanged with the term document where appropriate. Although specific examples presented herein make use of web pages as part of a specific implementation to provide illustration or context, systems, components and methods disclosed and described in this document are not limited to use only with web pages. Those of ordinary skill in the art will recognize from reading this disclosure that these disclosed and described systems, components, and methods can readily be applied to other types of information sources, such as other types of documents, either with or without modifications that are within the ability of a person of ordinary skill in this area.

Web pages or documents can include a number of hyperlinks to other web pages or documents and can themselves be targets of hyperlinks from other web pages or documents. Hyperlinks to and from web pages or documents are unidirectional. From the perspective of a single web page or document, a hyperlink can be viewed as a link that is inbound to the page from another page or an in-link. Alternatively, a hyperlink within a web page or document that points to another web page or document is an outbound link or an out-link.

In this paper, described is a lightweight transparent defense technique with the consideration of the above practical constraints. One technique is based on the notion of "script accenting". The basic idea is analogous to the accent in human languages, in which the accent is essentially an identifier of a person's origin that is carried in communications. To implement this, one can slightly modify a few functions at the interface of the script engine and the HTML engine so that (1) each domain is associated with a random "accent key", and (2) scripts and HTML object names are in their accented forms at the interface. Without needing an explicit check for the domain IDs, the accenting mechanism naturally implies that two frames cannot interfere if they have different accent keys.

The concept of script accenting provides a higher assurance for the implementation of the browser isolation mechanism. One can confidently define the script ownership and the object ownership, which are easily followed in the herein described implementation without any confusion. A prototype of the technique has been implemented on IE. The evaluation showed that all known cross-frame attacks were defeated. Moreover, because the accenting mechanism only slightly changes the interface between the script engine and the HTML engine, it is fully transparent to web applications. The stress test showed a 3.16% worst-case performance overhead, but the measurement of the end-to-end browsing time did not show any noticeable slowdown.

The rest of the paper is organized as follows: First discussed is related work. Briefly introduced are the basics of IE's domain-isolation mechanism after the related work discussion. Then presented is a case study of real-world attacks.

Then discussed are the design and the implementation of the script accenting mechanism, followed by experimental evaluations.

Related work includes that researchers have been studying security issues related to the same-origin principle, among which the cross-site scripting (XSS) problem has attracted much attention. A few interesting projects are summarized here. One proposal is a static analysis technique to find XSS bugs in Java applications. One study studied XSS attacks and identified the prerequisites for the attacks to hijack sessions. Proposed was the SessionSafe approach that removes the prerequisites to protect browser sessions. Because XSS attacks are due to the failures of script filtering, it has been proposed using taint tracking to detect the attacks. The attacks discussed in this paper are a different type of attacks. They exploit flaws in the browser isolation mechanism, not the input-filtering bugs on the web applications.

Interesting research has also led to the proposals of new policies of the browser isolation mechanism. Significant effort is spent on the discussion and the standardization of the browser's mechanisms to securely retrieve data from servers, among which XMLHttpRequest (see The XMLHttpRequest Object. W3C Working Draft 27 Sep. 2006. http://www.w3.org/TR/XMLHttpRequest/) and JSONRequest (see Douglas Crockford. "JSONRequest," http://www.json.org/JSONRequest.html) are the representatives. In addition to the effort on data retrieval mechanisms, researchers also found that the timing characteristics of caches and the coloring of visited links allow malicious scripts to infer certain browser states and thus track users' browsing histories. Accordingly, they specified the same-origin policies for browser caches and visited links. In this paper, how to specify better policies is not discussed, but focus on how to correctly and securely implement those that are well-specified.

The isolation bugs that were discussed are at the HTML and Javascript level, rather than the operating system (OS) process level. One can imagine that if the internet explorer (IE) process is compromised by buffer overrun or other binary code attacks, then the malicious binary code can directly access pages from different domains without exploiting any domain-isolation bugs at the HTML/Javascript level. These attacks can be thwarted by OS-level process isolations. For example, Tahoma is a web browsing system based on virtual machine monitor (VMM). It implements a browser operating system (BOS) to guarantee that each web application runs inside its own virtual machine. Therefore, even when a browser instance in a web application is compromised, it cannot interfere with other web applications. It should be noted that HTML/Javascript isolation and OS-level process isolation are very much orthogonal in today's browsers because no matter how the underlying processes are isolated, the HTML/Javascript semantics require the capabilities of cross-domain navigations, frame-hosting, event capturing, etc, which are the source of isolation bugs discussed in this paper.

This section gives a short introduction of IE's basic isolation mechanism—the frame-based isolation. In IE, each HTML document is hosted in a frame (or an inline frame, because the security aspect of inline frames is very similar to that of regular frames the term "frame" as used herein refers to regular frames and inline frames). A browser window is the top-level frame, which hosts the top-level document that may contain other frames. IE implements a security mechanism to guarantee that scripts from one frame can access documents in another frame if and only if the two frames are from the same domain.

FIG. 1 shows a browser 100 and a Frame 1 102 and Frame 2 104 that represent two frames in the browser 100. The document in Frame 1 is downloaded from http://a.com. The objects in the frame are stored in a DOM tree (i.e., a Document Object Model tree). The root of the DOM tree is a window object. Note that "window" in the DOM terminology actually represents a frame, which is not necessarily the entire browser window. The children of the window include: location 110, which is the URL of the document; event 112, which is the event received by this frame; document 114, which is the parsed HTML document contents; history 116, which is a collection of the URLs having been visited in this frame. The objects body and scripts have the common parent object document. The body object 120 contains primarily the static contents to be rendered in the frame. Scripts 122 is a collection of scripts that manipulate the DOM tree of its own frame and communicate with other frames. These scripts are compiled from the script source text embedded in the HTML file or passed from another frame. They are in a format of "bytecode", essentially the instruction set of the script engine. Each frame has a script runtime, which includes a stack, a heap, a program counter pointing to the current instruction in the scripts object, and a set of window references (to be discussed in the next paragraph). When the script accesses a DOM object, the script runtime executes an instruction "LoadMember baseObj, nameString" to get the object's reference. For example, to access document.body, the script runtime executes "LoadMember RefDocument, 'body'", where RefDocument is a reference to the document object. LoadMember is an instruction to look up a child object name and return the object's reference.

The script runtime keeps a window references object. The reference to the window object of Frame 1 is in the window references of Frame 1's runtime, so any script running in Frame 1 can get the reference to every object in its own DOM and manipulate it. Hypothetically, if a script running in Frame 2 from http://b.com had a reference to the window object of Frame 1, the script could also totally control the DOM of Frame 1, which violates the same-origin policy. Therefore it is a crucial security requirement that the reference to the window object should never be passed outside its own frame. Instead, Frame 2 has a window proxy windowProxy1 to communicate with Frame 1.

Conceptually the window proxy is a clone of the window object, but it is specifically created for Frame 2 to access Frame 1. The window proxy is the object in which the cross-frame check is performed: for any operation to get the reference of a child of windowProxy1, a domain-ID check is made to ensure that the domains of Frame 1 and Frame 2 are identical. For example, assuming a script is running in Frame 2, and windowProxy1 is represented as WND1 in the script, then the script expression "WND1.document" will fail with an access-denied error, because WND1 (i.e., windowProxy1) is the proxy between two frames from different domains. The domain-ID check in the window proxy is simply a string comparison to check if the two domains expressed in the plain text format are identical.

The mechanism described above appeared to provide a good isolation between frames of different domains. However, in the next section, a number of real attacks are analyzed that bypass or fool it to allow a malicious script to control a frame of another domain.

Now discussed is a study of real world attacks against IE. The isolation mechanism presented in FIG. 1 is designed to prevent a script from http://a.com to access the DOM from http://b.com. The implicit assumptions are (1) every cross-frame communication must go through a window proxy, (2)

the window proxy has the correct domain-IDs of the accessor frame and the accessee frame. Studied was the Microsoft Security Vulnerability database, and it was found that all discovered frame-isolation bugs are because of the invalidity of these assumptions. There are unexpected execution paths in the system to bypass the check or feed incorrect domain-IDs to the check. These exploit scenarios take advantage of the navigation mechanism, IE's interactions with other system components, function aliasing in the script runtime, excessive expressiveness of frame navigations, and the semantics of user events. In this section, four real attacks are discussed to show that it is very hard to for browser developers to exhaustively reason about all possible execution scenarios.

In these examples, one can assume the user's critical information is stored on the website http://payroll, and the malicious website visited by the user is http://evil. The goal of http://evil is to steal the payroll information and/or actively change the direct deposit settings of the user, for example. Used was "doEvil" to represent a piece of malicious Javascript payload supplied by http://evil that does the damage. In the following discussion, the attacker's goal is to execute doEvil in the context of http://payroll.

IE and Windows Explorer3 have tight interactions. For example, if one types "file:c:\" in the address bar of IE, the content area will load the folder of the local C drive. Similarly, if one types "http://msn.com" in the address bar of Windows Explorer, the content area displays the homepage of MSN. On Windows XP prior to Service Pack 2, this convenient feature gave the attacker a path to bypass the security check.

Figure 2:
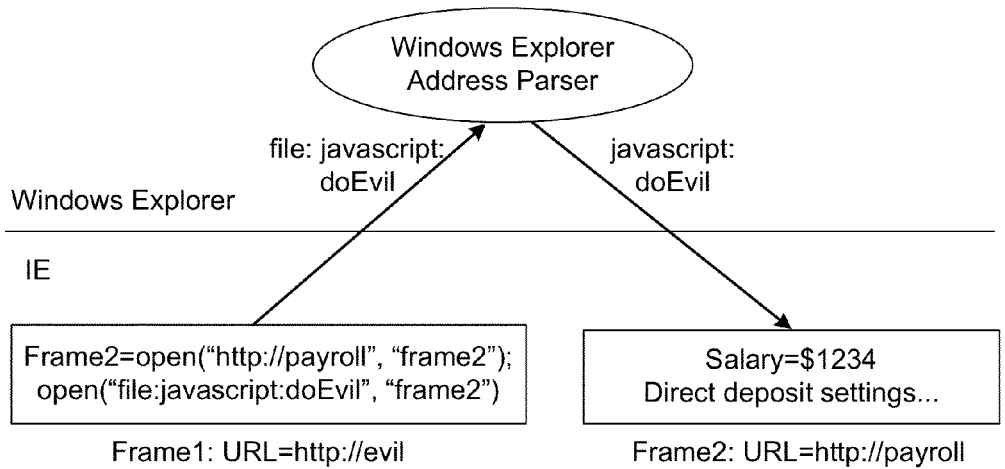
FIG. 2 illustrates an attack 1.

FIG. 2 illustrates an attack where the script of http://evil loads a frame for http://payroll and manipulates it by injecting doEvil into the frame. The script of http://evil, running in Frame 1, first opens the http://payroll page in Frame 2, and then navigates Frame 2 to the URL "file:javascript:doEvil". Because the protocol portion of the URL is "file:", IE passes the URL to Windows Explorer. Windows Explorer treats it as a normal file-URL and removes "files:" from it, and treats the remainder of the URL as a filename. However, the remainder is "javascript:doEvil", so Windows Explorer passes it back to IE as a javascript-URL. According to the "javascript:" protocol, navigating Frame 2 to such a URL is to add doEvil into the scripts of Frame 2 and execute it. Normally, one frame navigating another frame to a javascript-URL is subject to the same-origin policy. For example, the statement open("javascript:doEvil", "frame2") will result in an access denied error. However, since the javascript-URL is passed from the Windows Explorer, Frame 2 receives the script as if it was from the local machine, not from the Internet, which bypasses the same-origin check.

Now discussed is the exploitation of function aliasing. In Javascript, a method (i.e., a member function) itself is also an object, and thus its reference can be assigned to another object, which is essentially an alias of the function. The aliasing combined with the frame navigation could result in a very complicated scenario where the real meaning of a script statement is difficult to obtain based on its syntactical form.

Figure 3:
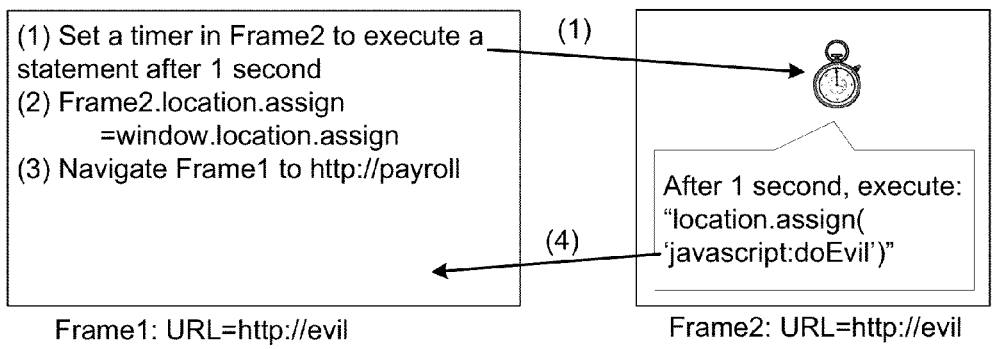
FIG. 3 illustrates an attack 2.

The attack shown in FIG. 3 has four steps: (1) Frame 1 loads the script from http://evil, which sets a timer in Frame 2 to execute a statement after one second; (2) the script makes "frame2.location.assign" an alias of "window.location.assign". According to the DOM specification, executing the method location.assign (URL) of a frame is to navigate the frame to URL; (3) the script navigates its own frame (i.e., frame 1) to http://payroll; (4) when the timer expires, location.assign ('javascript:doEvil') is executed in Frame 2. Because of the aliasing, the statement really means "frame 1.location.assign('javascript:doEvil')". Despite that it is physically a cross-frame navigation to a javascript-URL, the operation is syntactically an intra-frame operation, which does not trigger the cross-frame check. As a result, doEvil is merged into the scripts of the http://payroll DOM, and is executed.

Now discussed is the exploiting of the excessive expressiveness of frame navigation calls. The syntax of frame navigation calls can be very expressive. An attacker page can exploit the excessive expressiveness to confuse IE about who really initiates the operation.

Figure 4:
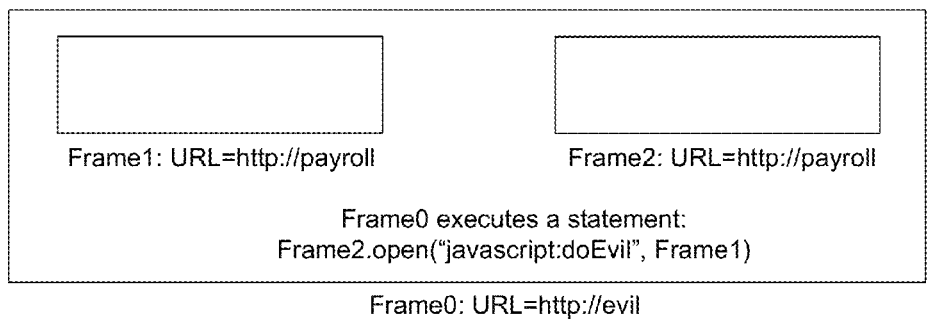
FIG. 4 illustrates an attack 3.

Shown in FIG. 4 above, Frame 0 from http://evil opens two frames, both loading http://payroll. These two frames are named Frame 1 and Frame 2. Then the script running in Frame 0 executes a confusing statement frame2.Open("javascript:doEvil",frame1). This is a statement to navigate Frame 1 to the URL "javascript:doEvil", but the critical question is who is the initiator of the navigation, Frame 0 or Frame 2? In the unpatched versions of IE, Frame 2 is considered the initiator, because the open method being called is a member of Frame 2. Therefore, the cross-frame check is passed because Frame 1 and Frame 2 are both from http://payroll. Similar to all previous examples, doEvil is then merged into Frame 1's scripts and is executed.

Now discussed is the exploiting of the semantics of user events. Discussed herein were a number of attacks in which a piece of script from the attacker frame can be merged into the scripts of the victim frame. The other form of attacks is to merge the victim's DOM into the attacker's DOM so that the attacker's script can manipulate it.

Figure 5:
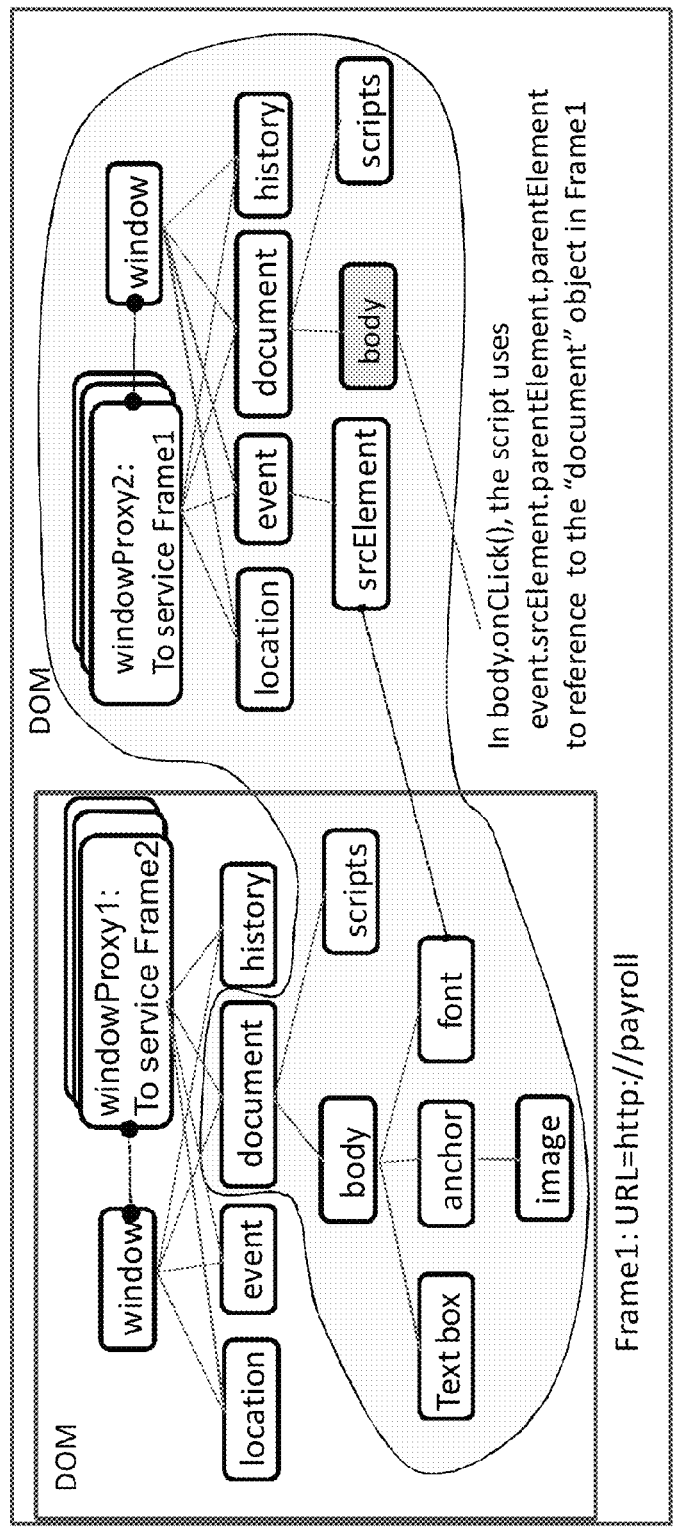
FIG. 5 illustrates an attack 4.

The DOM objects have the setCapture method to capture all mouse events, including those outside the objects' own screen regions. In the attack shown in FIG. 5, the script from http://evil in Frame 0 creates Frame 1 to load http://payroll, then calls "document.body.setCapture( )" to capture all mouse events so that they invoke the event handlers of the body element of Frame 0 rather than the element under the mouse cursor. When the user clicks inside Frame 1, the event is handled by the method body.onClick( ) in Frame 0 because of the capture. Suppose the user clicks on the font object in Frame 1, the DOM object event.srcElement in Frame 0 becomes an alias to the font object, according to the dentition of event.srcElement. Therefore, the script of body.onClick( ) can traverse in Frame 1's DOM tree as long as the traversal does not reach the window proxy level. In other words, Frame 1's document subtree is merged into Frame 0's DOM tree, so the script can reference to the document object using "F1Doc=event.srcElement.parentElement.parentElement". In particular, the script doEvil can be executed in Frame 1 by the assignment F1Doc.scripts(0).text=doEvil.

Now discussed is the design/implementation of the script accenting mechanism for defense. Discussed herein are a number of real attacks. The isolation failures are not because of any errors in the cross-frame check is discussed herein, but because of two reasons: (1) there exist unexpected execution scenarios to bypass the check; (2) the current mechanism is a single-point check buried deep in the call stack—at the time of check, there are confusions about where to obtain the domain-IDs of the script and the object. It is challenging for developers to enumerate and test all these unexpected scenarios because too many code modules are involved, including the scripting engine, the HTML engine, the navigation mechanism, the event handling mechanism, and even non-browser components. Each of them has a large source code base that has been actively developed for more than 10 years. It is clearly a difficult task to guarantee that the checks are performed exhaustively and correctly.

Described herein is a script accenting as a defense technique. The technique takes advantage of the fact that the browser executable has a clean interface between the component responsible for the DOM (e.g., the HTML engine mshtml.dll in IE) and the component responsible for the Javascript execution (e.g., the Javascript engine jscript.dll in IE). Because by definition the domain-isolation attack is caused by the script of one domain accessing the DOM of another domain, if both components carry their domain-specific accents in the communications at the interface, the communications can succeed only when the accents are identical. To achieve this, one can assign each domain an accent key, which is only visible to the HTML engine and the Javascript engine, but not to the Javascript code. Accenting is the operation to tightly bind the accent key with the script. This section describes the herein described design and implementation of the accenting mechanism on IE.

A possible implementation of the accenting operation could be to attach the accent key with the script when the script is generated, and to propagate the accent key with the script in memory copies. This mechanism is often referred to as "tainting". Usually, tainting is implemented as a system-wide infrastructure at the hardware architecture level or in the virtual machine. One however may want to implement the accenting mechanism completely in the browser, where it is not practical to track all memory operations because of the complexity of the source code. Furthermore, Attack 1 is an example to show that the script can even travel to a non-browser component, so tainting-based implementation is not possible.

XOR-based randomizations are frequently used in security defenses. One current implementation also uses XOR as the primitive operation for accenting: one can generate a 32-bit random number (four-bytes) as the accent key for each domain. The primitive operation to accent a text string is to XOR every 32-bit word in the string with the accent key. When there are one, two or three bytes remaining in the tail of the string, one can mask the accent key to the same length, and apply the XOR operation. This accenting operation has two clear advantages: (1) it guarantees that the accented script or any portion of the script is illegible to other domains, regardless of how the script travels; (2) the operation does not increase the length of the script, so the existing browser code can correctly handle the accented script without the possibility of buffer overflow. This is important for the transparency of the herein described mechanism.

Now discussed are accent key generation and assignments. One can keep a lookup table in the HTML engine (mshtml.dll) to map each domain name to an accent key. The keys can be generated in a Just-In-Time fashion: immediately after the document object is created for each frame, one can look up the table to find the key associated with the domain of the frame (if not found, create a new key for the domain), and assign the key to the window object (i.e., the frame containing the document).

When the scripts object is created, it copies the key from the window object. This is for the sake of runtime efficiency when the script runtime references the key later. Otherwise, it would be time-consuming for the script runtime to retrieve the key from the DOM because the script runtime and the HTML engine are implemented in different DLLs.

The browser provides support for a frame to change its domain during the page rendering and the execution of its script. For example, the Virtual Earth application (at http://map.live.com) initially runs in the domain http://map.live.com, and later changes its domain to http://live.com in order to communicate with other http://live.com services. To support this feature, one can redo the key generation/assignment operations when the document.domain attribute is changed. Note that in the domain isolation mechanism shown in FIG. 1, http://map.live.com and http://live.com are two different domains once the domain changing operation is done, so each one has its own accent key. In other words, when a frame is from http://live.com or from http://map.live.com with its document.domain set to http://live.com, its accent key is the one correspondent to http://live.com; if a frame is from http://map.live.com without its document.domain being set, its accent key is the one correspondent to http://map.live.com.

Now discussed is Script Ownership and Object Ownership. Above it was shown that it can be challenging to guarantee the correctness of the current isolation mechanism because the developers need to reason about it as a system-wide property. Reasoning about the correctness of the script accenting mechanism is significantly easier because one only needs to guarantee that every script executes and travels in its accented form. In particular, one can conform to two simple rules.

Rule of Script Ownership:

One of the difficulties in the current window-proxy-based check is that at the time when the check is performed, it is hard to determine the origin of the script. Attack 2 and Attack 3 exemplify this difficulty. One implementation follows the rule that the script always carries its owner frame's identity. The rule of script ownership states that a script is owned by the frame that supplies the source code of the script, and should be accented at the time when its source code is supplied. The rationale is that the source code supplier defines the behavior of the script, so one needs to guarantee that the script is illegible to the frames from domains other than the source code supplier's domain. Discussed herein is that this principle eliminates the attacker's possibility of using wrong domain-IDs to fool the check.

Rule of Object Ownership:

The rule of object ownership states that every object is owned by the frame that hosts the DOM tree of the object, and is always known by its accented name. The rationale of this principle is that an object can be referenced in many ways due to aliasing, so it is error-prone to determine the object's origin based on its syntactical reference. Instead, an object's origin should be only determined by the window object (i.e., the frame) of its DOM tree, because this ownership relation is established at the DOM creation time.

Now discussed is accenting the script source code to defeat script merging attacks. Many cross-frame attacks are because of script merging, as was shown above. In the browser, a text string can be sent to another frame and compiled as a script by (1) calling certain methods of the window object, including execScript(ScrSrc), setTimeout(ScrSrc, . . . ) and setInterval (ScrSrc . . . ), where ScrSrc is the text string of the script source code, or (2) navigating the frame to a Javascript-URL. The format of the Javascript URL is "javascript:ScrSrc", where ScrSrc is the script source code in the plain text format. There are many ways to navigate to a javascript-URL, such as the method calls "open( . . . )", "location= . . . ", "location-.assign( . . . )", "location.replace( . . . )", and HTML hyperlinks "<base href= . . . >", "<a href= . . . >", etc. Note that the Javascript function eval is to evaluate a text string in the current frame, so it is not a cross-frame operation.

Figure 6:
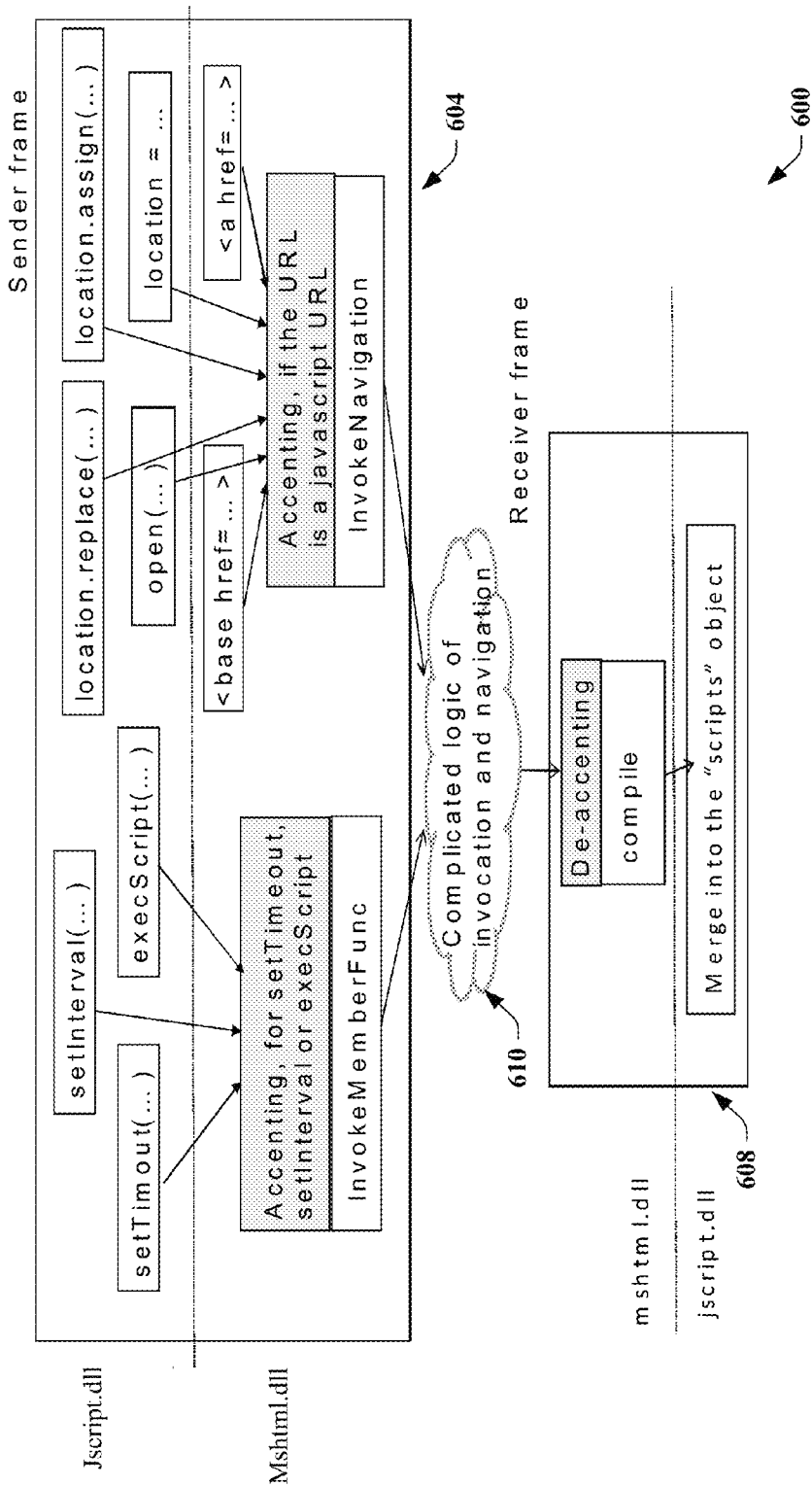
FIG. 6 illustrates Accenting/De-Accenting script source code.

For each invocation or navigation scenario, a call path was obtained. These paths form a call graph 600 shown in FIG. 6. It was observed that internally a common function called by execScript, setTimeout and setInterval is InvokeMemberFunc, and a common function called for all Javascript URL navigations is InvokeNavigation. Therefore, it was chosen to insert the accenting operation before InvokeMemberFunc and InvokeNavigation. At these two functions, it is straightforward to conform to the rule of script ownership: since the caller script supplies the source code of the script to be sent to another frame, the accent key should be taken from the frame hosting the caller script.

The call graph in the receiver frame 608 is much simpler than the call graph in the sender frame 604. Because the scripts object in the DOM is in the "byte-code" format, any received script source code needs to be compiled before being merged into the scripts object of the receiver frame. Function Compile is the entry function of the compilation, which is an ideal location to perform the de-accenting operation, i.e., removing the accent from the script by applying an XOR using the accent key of the receiver.

As discussed above, exploitable bugs have been discovered in the past in the complicated logic that implements cross-frame invocation and navigation, which was represented as a cloud 610. A significant advantage of the herein described design is that one does not need to understand this complicated logic. The security of the herein described mechanism only relies on the fact that any script needs to be compiled by the function compile before it is executed. Note that although it is believed InvokeMemberFunc and InvokeNavigation are able to comprehensively perform accenting in all script-sending scenarios, the security does not rely on the comprehensiveness—hypothetically, if there were an unexpected scenario to send a script without being accented, it would fail the compilation in the receiver frame. In other words, the incomprehensiveness would not cause a security compromise, but a compatibility problem only cause a fail-stop, but not a security bug. Of course, fail-stop is also undesirable as it causes application incompatibilities. Below it is shown that there has not been found any incompatibility when the herein described methods were tested against real applications.

Now discussed is accenting the object name queries to defeat DOM merging attacks. Real-world attacks can also be caused by DOM merging, in which case an object can be directly accessed by a script running in another domain without going through the window proxy object.

A script references an object (e.g., "window.location"), an attribute (e.g., "window.status") or a method (e.g., "window.open") by name. The distinction between the terms "object", "attribute" and "method" is not important in the later discussion, so as used herein the term "object" refers to all of them.

To reference to an object, the script runtime iteratively calls into the DOM for name lookups. For example, the reference window.document.body is compiled into a segment of byte-code, which (1) gets the window object O, and looks up the name "document" under O to get the object referred to as O1; (2) looks up the name "body" under the object O1 to get the object O2, which is the body object. Note that the mapping from a name to an actual DOM object is not necessarily injective, i.e., there can be different names mapped to the same object. In the example above the font object can be referenced either by "Frame1.document.body.children(3)" or by "window.event.srcElement". From the perspective of the script runtime, the execution paths of these two references are unrelated.

Figure 7:
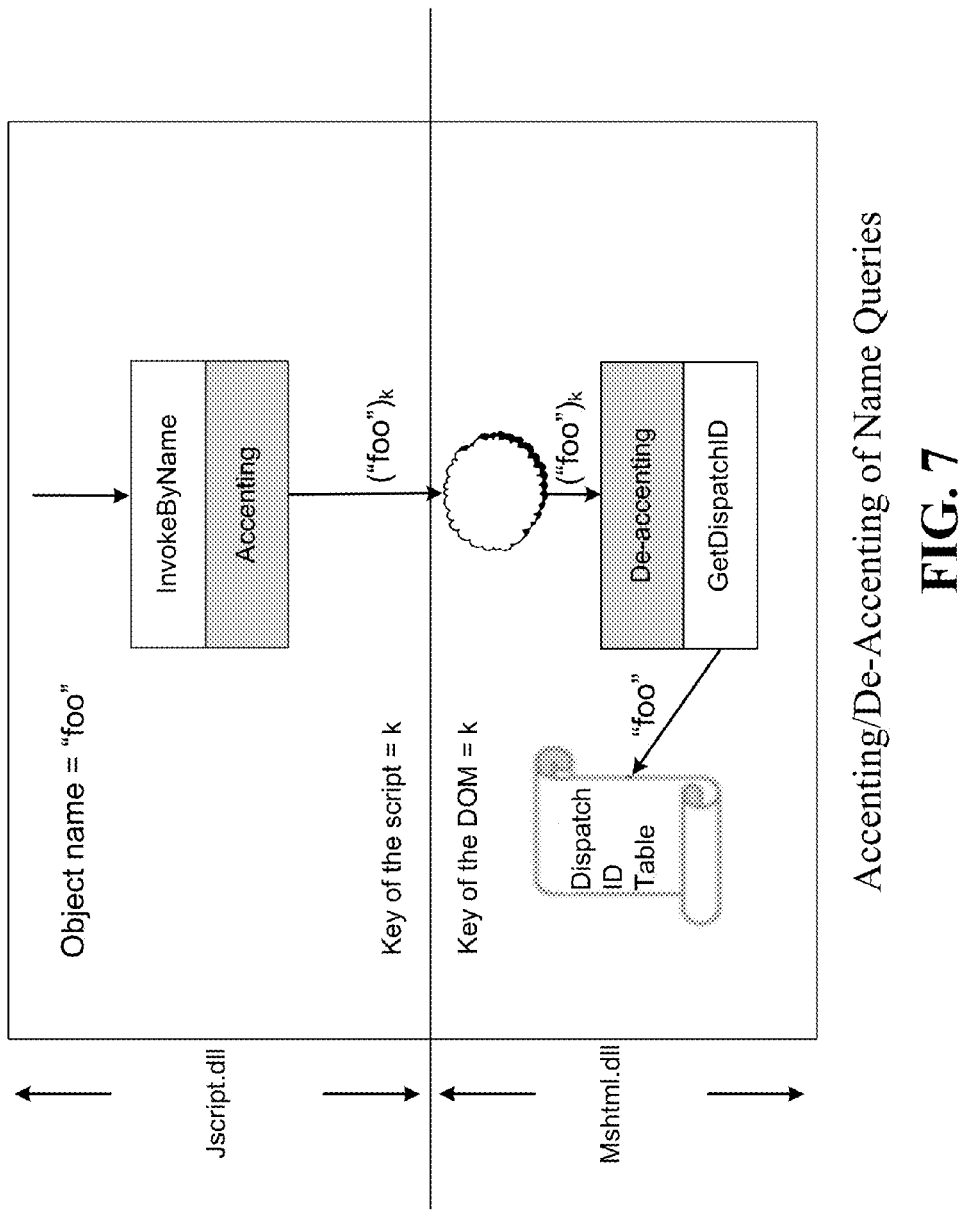
FIG. 7 illustrates Accenting/De-Accenting of name queries.

To obtain the call graph of name querying, various name querying scenarios were studied, including the queries of objects as well as the aliases of them. Because IE uses the COM programming model (Don Box. Essential COM. ISBN 0-201-63446-5. Addison Wesley.), the browser objects are implemented as dispatches, each represented by a dispatch ID. Obtaining the dispatch ID is a necessary step before a script can do anything to the object. In the script runtime, the interface function for name querying is InvokeByName, which is responsible for mapping an object name string to a dispatch-ID. However, the script runtime does not have the knowledge about the dispatch ID table, so the name query is passed into the HTML engine (mshtml.dll), where the function GetDispatchID performs the actual lookup. Having the above knowledge, one way is clear on how to implement the herein described mechanism: (1) the accenting should happen at function InvokeByName using the key of the frame of the script; (2) the de-accenting should happen at function GetDispatchID using the key of the frame hosting the DOM (FIG. 7). This reflects the rule of object ownership—every object is owned by the frame that hosts its DOM, regardless of how the object is referenced. In this design, the security only relies on the fact that every object-reference needs to call GetDispatchID to obtain the dispatch-ID, which it is believed is a simple assertion to make based on the browser implementation. One does not need any assumption about the code paths of object-name querying, which are difficult to exhaustively enumerate.

Note that in IE's implementation, the object names in DOM trees and scripts are represented using wide-characters (two bytes per character). In a rare situation when the object name of the cross-DOM reference has only a wide-character, the strength of the XOR operation is weaker than usual, because the probability of a successful random guess is 1/(2562), not 1/(2564). A straightforward solution is to pad a wide-character, e.g., "0x0001", to the original one-character object name before applying the accenting operation. After the de-accenting, the padding character "0x0001" should be removed from the name string.

Now discussed are other ways of implementing the script accenting mechanism. The basic idea of accenting is to introduce domain-specific versions of scripts and HTML object names. As a concrete implementation, one can use the XOR operation to bind a domain-specific secret with the string being accented. This is by no means the only way to implement the accenting mechanism. The XOR operation is conceptually equivalent to tagging a domain ID to the string. A possible alternative implementation is to use a hash value of the domain name as the accent key K, and a string S can be accented as "K#S". When it is de-accented, K is compared with the accent key of the destination frame, and removed if identical. Nevertheless, this scheme might have some concerns: (1) the string S still travels inside the browser in its plain text form. If the attack has a way to reference to it, it can be precisely corrupted; (2) this scheme requires extra bytes for the accented string. Reallocating larger buffers is not always easy when one works on legacy code. It may cause compatibility problems, and requires source code understanding in order to free these buffers correctly.

Figure 8:
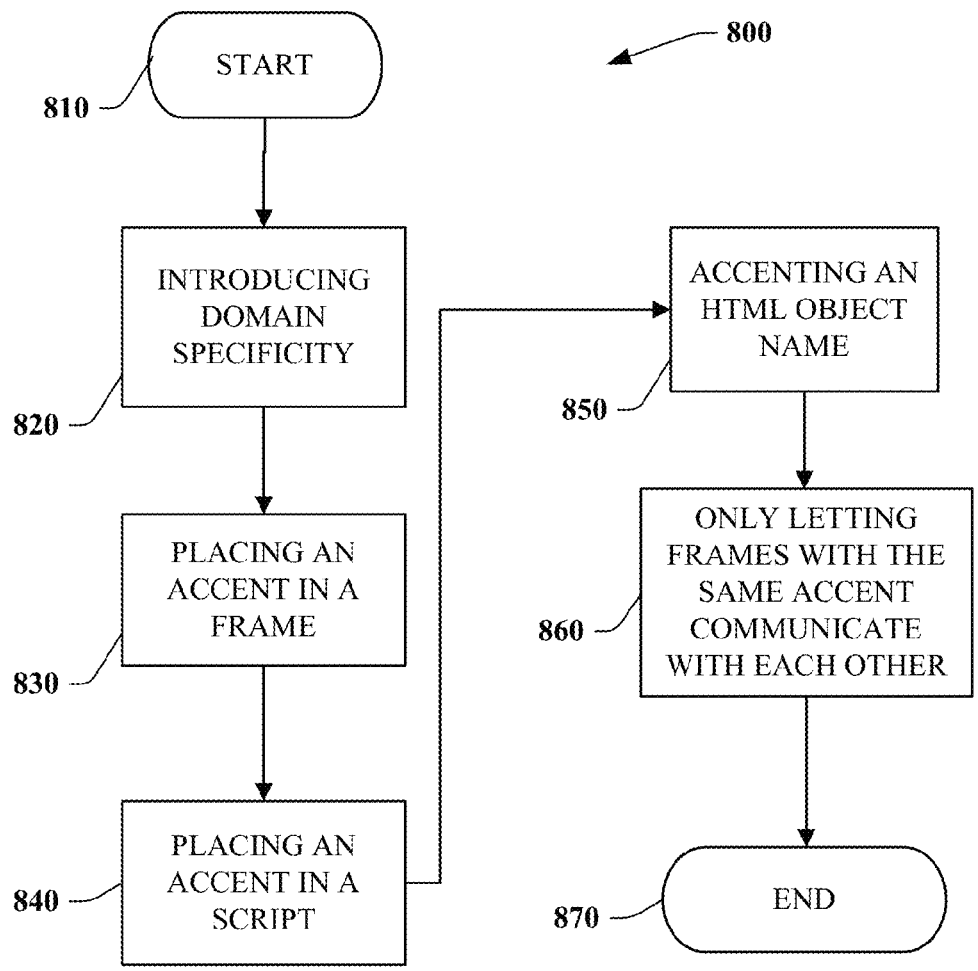
FIG. 8 is a flow diagram depicting a method that can be employed in conjunction with components disclosed or described herein.

However, except these potential concerns, it is believed that "accenting" is a high-level idea that may have several valid implementations. FIG. 8 illustrates a flow chart 800 starting at process block 810. At 820 is introducing domain specificity to a frame of an HTML object name. At 830 is placing an accent in a frame and at 840 is placing an accent in a script. Accenting an HTML object is at 850, and only letting frames with the same accent communicate with each other is at 860. At process block 870, the process ends. Placing an accent in a frame 830, placing an accent in a script, and accenting an HTML object are all specific manners of performing the generic introducing domain specificity 820.

Figure 9:
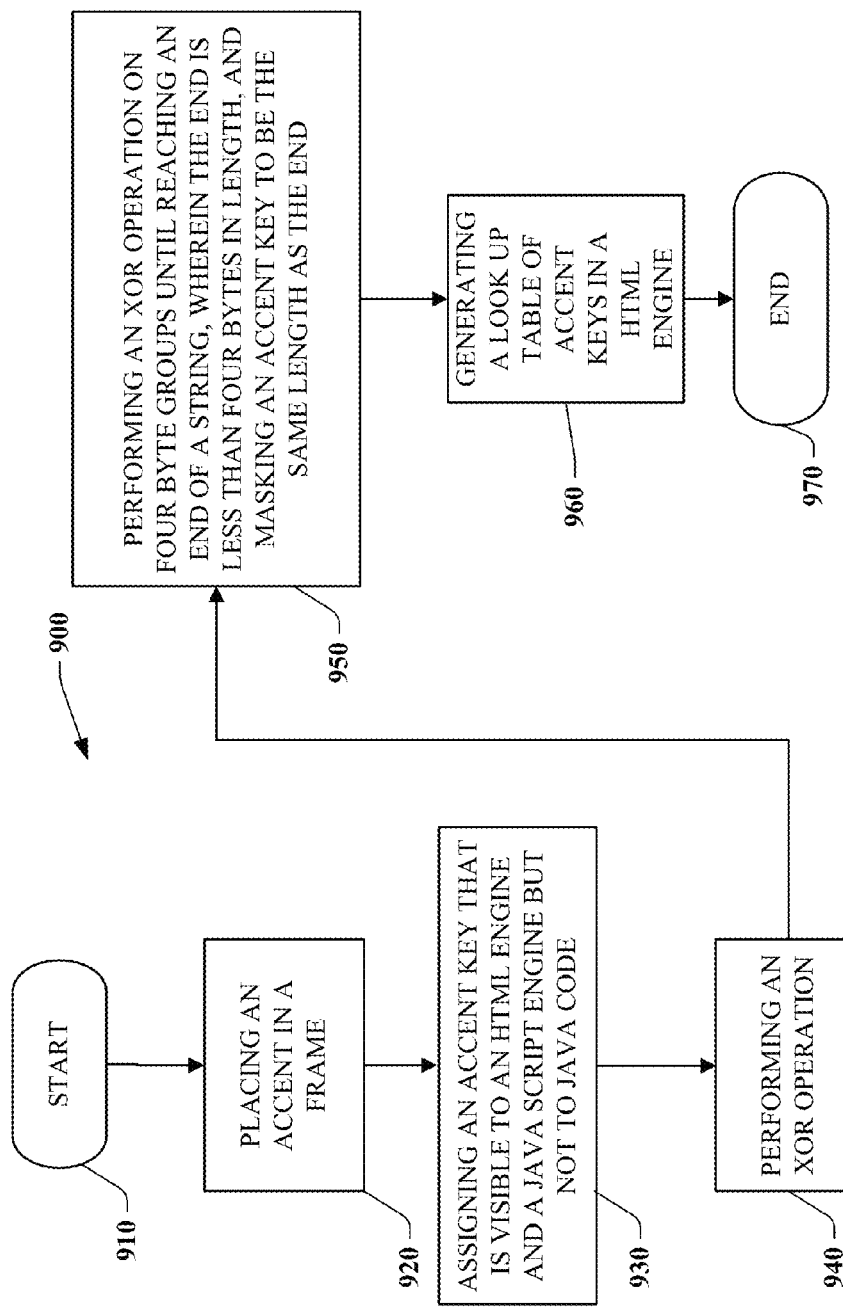
FIG. 9 is a flow diagram depicting a method that can be employed in conjunction with components disclosed or described herein.

FIG. 9 illustrates a flow chart 900 with a start process block at 910. At 920 is placing an accent in a frame. At 930 is assigning an accent key that is visible to an HTML engine and a java script but not to java code. At 940 is performing an XOR operation. At 950 is performing an XOR operation on four byte groups until reaching an end of a string, wherein the end is less than four bytes in length, and masking an accent key to be the same length as the end. At 960 is generating a look up table of accent keys in a HTML engine, and the process flow ends at end block 970.

Figure 10:
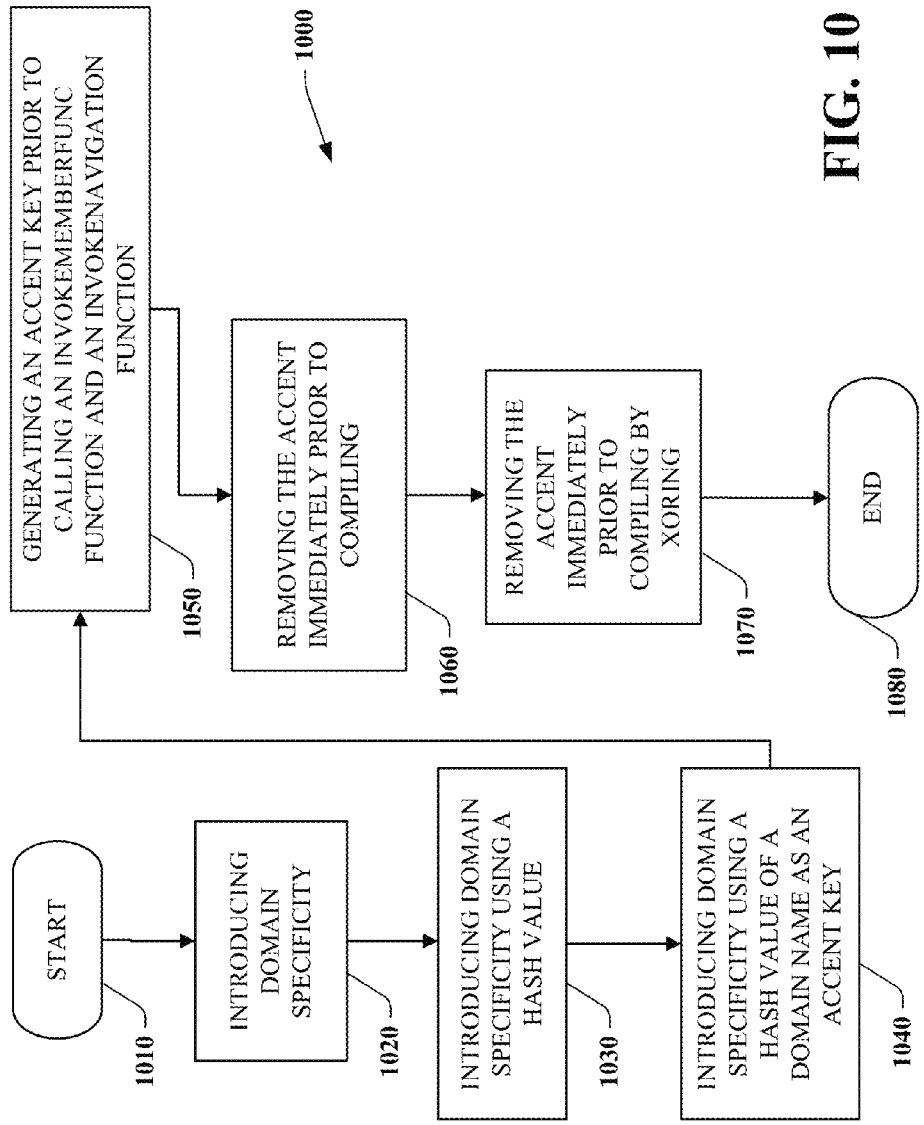
FIG. 10 is a flow diagram depicting a method that can be employed in conjunction with components disclosed or described herein.

FIG. 10 is a flow chart 1000 starting at 1010, where at 1020 is introducing domain specificity. At 1030 is introducing domain specificity using a hash value, and at 1040 is introducing domain specificity using a hash value of a domain name as an accent key. At 1050 is generating an accent key prior to calling an invokememberfunc function and an invokenavigation function. At 1060 is removing the accent immediately prior to a compiling. And at 1070 is removing the accent immediately prior to compiling by XORing. The flow chart ends at an end block 1080.

Now discussed are evaluations. The script accenting mechanism can be implemented on the current version of IE (version 7) and the version shipped with Windows XP™ (version 6), because their isolation mechanisms have no significant difference. Currently, IE version 6 was chosen as the test platform or as the platform to prototype the technique because most known cross-frame bugs have been patched individually in IE version 7. In this section, the effectiveness of the herein described defense against real attacks in the past are evaluated. Because the script accenting is a generic technique, it is believed that it will also be effective against this type of attacks discovered in the future. This section also presents the evaluation results about the transparency and the performance overhead of the herein described defense mechanism.

Now revisited are the attack scenarios discussed above 4 and demonstrated is how the script accenting mechanism can defeat all these attacks. Also, these examples support the position that the correct implementation of the accenting/de-accenting operations is significantly more robust than that of the current frame-based isolation mechanism(s). While the latter attempts to enforce a global property about how information is propagated in the system, the former focuses on the more tractable task of enforcing local properties at a few instrumentation locations.

As shown in FIG. 2, the attack is to exploit a path that causes Windows Explorer to send a piece of script supplied by the malicious frame to the victim frame. It is very hard for IE developers to anticipate that Windows Explorer, which is a component outside IE, can be used to relay the javascript-URL between two IE frames.

The same attack was launched against the IE executable with the script accenting in place. When the script executed open("file:javascript:doEvil", "frame2"), it was observed that the function InvokeNavigation gets the URL argument file:javascript:doEvil (see FIG. 6 for the call graph), which was not accented because the URL is not a javascript-URL. The URL is then passed to Windows Explorer, corresponding to the cloud of complicated navigation logic in FIG. 6. Windows Explorer removed the "file:" prefix and handled it as a javascript-URL, so it passed the URL javascript:doEvil to frame 2, which is the receiver frame. Before the compilation of the string doEvil, the accent key of frame 2 is used to de-accent the string. Because no accenting operation had been performed on doEvil in the sender frame, the de-accenting operation makes it illegible for the compilation, and thus the attack is thwarted.

Attack 2 exploits the function aliasing to confuse Frame 1 about which frame really initiated the "location.assign" call (see FIG. 3). Because of function aliasing, the timer for delayed execution, and the navigation happening in the meanwhile, the execution path leading to the attack is highly convoluted.

When the attack was launched against the IE executable, steps (1)-(3) of the attack are unaffected by the script accenting mechanism. At step (4), despite the confusion caused by the aliasing of location.assign, the rule of script ownership is straightforward to conform to—the string doEvil was supplied by the script running in Frame 2, so it was accented using the key of http://evil. This accented version of the string doEvil was then de-accented using the key of http://payroll at the receiver frame (Frame 1), and failed to be compiled because the receiver key is the wrong key.

In Attack 3, because of the confusing navigation statement, the cross-frame check is erroneously performed to examine if frame 2 can navigate frame 1 to a javascript-URL. This is a wrong check because frame 0, not frame 2, is the real initiator of the navigation.

When the attack was replayed on the IE executable, there was no confusion about the accenting policy. Frame 0 supplied the javascript-URL, so Frame 0's key, corresponding to http://evil, was used in the accenting operation. When this URL is received by Frame 1, it was de-accented using the key of http://payroll, and thus the attack was not effective.

Attack 4 exploits the semantics of user events. The script in Frame 0 can reference to the DOM objects in frame 1 through event.srcElement, and therefore does not need to pass the cross-frame check performed by the window proxy between frame 0 and frame 1.

The IE executable defeated this attack because of the accenting of object name queries. The script in frame 0 was able to reference to event.srcElement, which is an alias of an object in frame 1. However, because of the mismatch between the DOM key and the script key (see FIG. 7), the script cannot access to any attribute/method/sub-object of the object. Therefore, merely obtaining the cross-frame object reference is useless. This is similar to the situation in a C program where a pointer references to a memory location that is not readable, writable or executable, and any dereference of the pointer results in a memory fault.

Now discussed is the impossibility of XOR probing attacks. Because the current implementation uses XOR ($\oplus$) as the primitive operation for accenting, the security relies on the invisibility of the accent keys to the attacker's script. Hypothetically, if the attacker's script had the knowledge about $k_{atk} \oplus k_{vtm}$, where $k_{atk}$ is the accent key of the attacker frame and $k_{vtm}$ is the accent key of the victim frame, then the attacker can send the script "doEvil $\oplus (k_{atk} \oplus k_{vtm})$" to the victim frame, which will be accented and then de-accented to "doEvil". Therefore, a caveat of XOR-based security approach is that the attacker might have smart methods to efficiently guess the value of $(k_{atk} \oplus k_{vtm})$.

Remember that the accent keys are four-byte words in one embodiment. The attacker could guess the first two bytes of $(k_{atk} \oplus k_{vtm})$ and send the script ("//xx"$\oplus(k_{atk} \oplus k_{vtm})$) to the victim frame. If the guess is correct, the script will be compiled correctly because "//" denote a comment line in javascript. If the guess is incorrect, a syntax error will be generated by the victim frame. If the attacker can catch the syntax errors, he/she can successfully guess the first two bytes in 65536 attempts. Then he/she can probe the third byte by using ";//x" in 256 attempts, and the fourth byte by using ";;//" in another 256 attempts. Of course the use of other than four byte words is contemplated, and 16 bytes and 256 bytes are possible.

Although the above probing attack seems plausible at the first glance, it is not effective for two reasons. First, observe that scripts in IE are always represented using wide-characters, which means the string "//" is already four-byte long. It requires 256⁴ attempts to guess. More fundamentally, even for a browser not using the wide-character representation, the attack still lacks an important prerequisite—there is no way for the attacker frame to detect a syntax error in the victim frame, because the two frames are in different domains. In other words, for the probing attack to succeed, the attacker frame already needs the capability to communicate with the victim frame (e.g., through the one error method of the victim frame), but such a prerequisite is exactly the domain-isolation violation that the attacker tries to achieve. This is a cyclical cause-and-effect situation. Therefore, the XOR-probing is not a real concern of the accenting mechanism.

Another issue related to XOR probing is the potential weakness in accenting an object name that has only one wide-character. This is discussed above and one may need to pad another wide-character so that the object name is four-bytes long.

The decision as to what size key to use can be done at partially utilizing an artificial intelligence (AI) layer or component. The AI layer or component can be employed to facilitate inferring and/or determining when, where, how to dynamically vary the size of the key and the associated level of security. Such inference results in the construction of new events or actions from a set of observed events and/or stored event data, whether or not the events are correlated in close temporal proximity, and whether the events and data come from one or several event(s) and data source(s).

The AI component can also employ any of a variety of suitable AI-based schemes in connection with facilitating various aspects of the herein described innovation. Classification can employ a probabilistic and/or statistical-based analysis (e.g., factoring into the analysis utilities and costs) to prognose or infer an action that a user desires to be automatically performed. The AI layer can be used in conjunction with the security layer to infer changes in the data being transferred and make recommendations to the security layer as to what level of security to apply.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

The disclosed and described components, for example in connection with matching or inference tasks, can employ various artificial intelligence-based schemes for carrying out various aspects thereof. For example, inference or likely search terms or matching of topological maps or sets of demographic information, among other tasks, can be carried out by a neural network, an expert system, a rules-based processing component, or a support vector machine.

A classifier is a function that maps an input attribute vector, $X=(x_1, x_2, x_3, x_4, \ldots x_n)$, to a confidence that the input belongs to a class, that is, $f(X)$=confidence(class). Such a classification can employ a probabilistic and/or statistical-based analysis (for example, factoring into the analysis utilities and costs) to prognose or infer an action that a user desires to be automatically performed. In the case of a page-biased search system, for example, attributes of a reference set of information to be used in a comparison can be used to determine whether a similar set can be considered to match the reference set.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including but not limited to ranking search results.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

Figure 11:
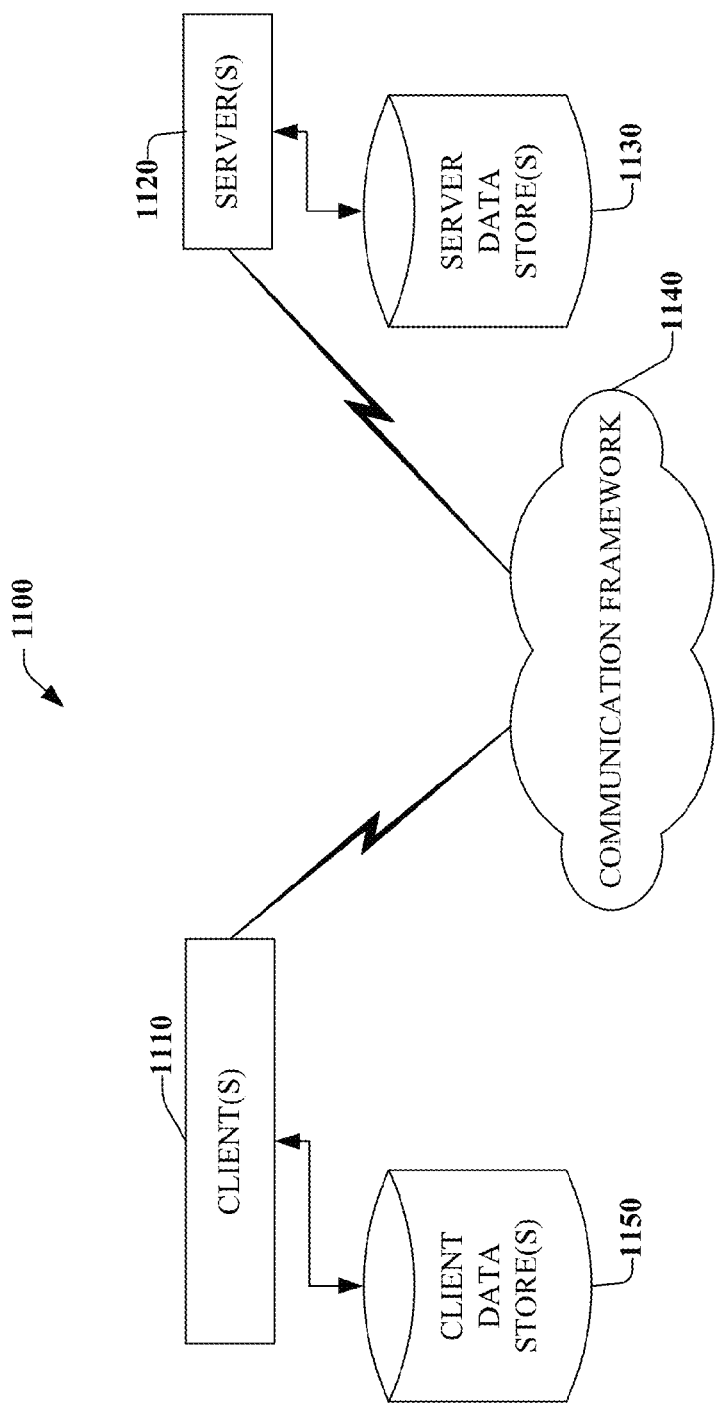
FIG. 11 illustrates an exemplary networking environment.

FIG. 11 is a schematic block diagram of a sample-computing environment 1100 within which the disclosed and described components and methods can be used. The system 1100 includes one or more client(s) 1110. The client(s) 1110 can be hardware and/or software (for example, threads, processes, computing devices). The system 1100 also includes one or more server(s) 1120. The server(s) 1120 can be hardware and/or software (for example, threads, processes, computing devices). The server(s) 1120 can house threads or processes to perform transformations by employing the disclosed and described components or methods, for example. Specifically, one component that can be implemented on the server 1120 is a security server, such as the security server 240 of FIG. 2. Additionally, various other disclosed and discussed components can be implemented on the server 1120.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the server(s) 1140.

Figure 12:
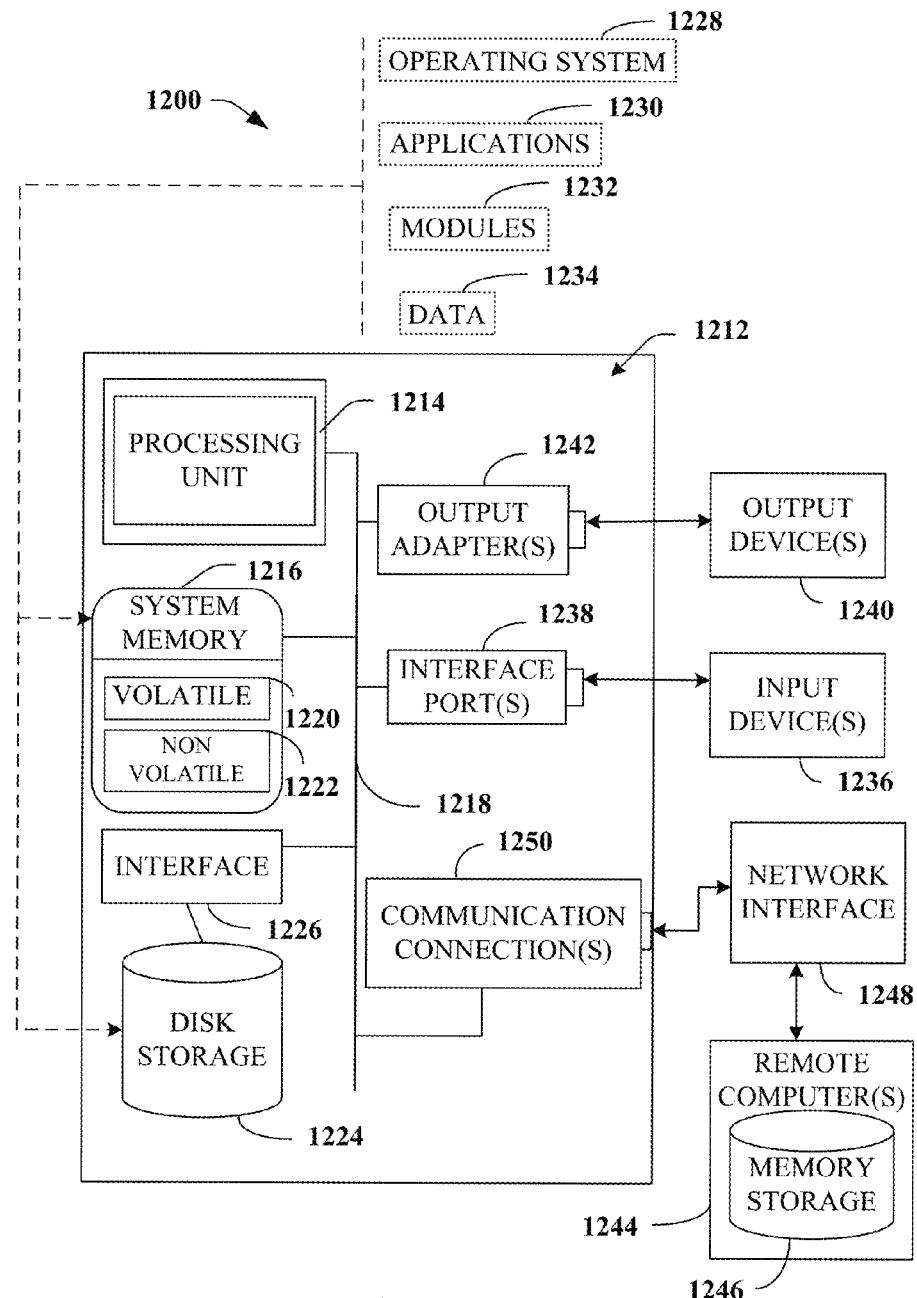
FIG. 12 illustrates an exemplary operating environment.

With reference to FIG. 12, an exemplary environment 1200 for implementing various components includes a computer 1212. The computer 1212 includes a processing unit 1214, a system memory 1216, and a system bus 1218. The system bus

1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Peripheral Component Interconnect Express (PCI Express), ExpressCard, Card Bus, Universal Serial Bus (USB), Advanced Graphics Port (AGP), Personal Computer Memory Card International Association bus (PCMCIA), Firewire (IEEE 1394), Serial Advanced Technology Attachment (SATA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

The various types of volatile and non-volatile memory or storage provided with the computer 1212 can be used to store components of various implementations of the data port signaling system disclosed and described herein. For example, with reference to FIG. 1, the ranking module 110 can be implemented as a software module in the non-volatile memory 1222. At runtime, information the ranking module 110 can be loaded into the volatile memory 1220 from where machine-interpretable code can be accessed by the processing unit 1214 and thereby placed into execution.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the disclosed components and methods can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. The interface ports 1238 specifically can include various data connection ports that can be used with components disclosed and described herein, among others.

Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes illustrative examples of certain components and methods. It is, of course, not possible to describe every conceivable combination of components or methodologies, but one of ordinary skill in the art will recognize that many further combinations and permutations are possible. Accordingly, all such alterations, modifications, and variations are intended to fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (for example, a functional equivalent), even though not structurally equivalent to the disclosed structure, which performs the function in the herein illustrated examples. In this regard, it will also be recognized that the disclosed and described components and methods can include a system as well as a computer-readable medium having computer-executable instructions for performing the acts and/or events of the various disclosed and described methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method performed by a computing device, comprising:
    placing an accent in a browser frame, during generation of at least one script that runs in the browser frame, by applying an XOR operation to combine an accent key with source code of the at least one script, the accent key being uniquely associated with a domain of the at least one script, wherein the accent key is a hash of a domain name of the domain;
    allowing communication between the browser frame and another browser frame with an identical accent to the accent, while preventing communication between the browser frame and other browser frames that do not have the identical accent; and
    removing the accent from the browser frame prior to compiling the source code.

2. The method of claim 1, wherein the placing the accent in the browser frame includes placing the accent in the browser frame prior to the browser frame supplying the source code of the at least one script.

3. The method of claim 1, further comprising accenting a HyperText Markup Language (HTML) object name.

4. The method of claim 1, further comprising assigning the accent key to the browser frame.

5. The method of claim 1, wherein the accent key is visible to a script engine.

6. The method of claim 1, wherein the accent key is visible to a HyperText Markup Language (HTML) engine and a script engine.

7. The method of claim 1, wherein the placing the accent in the browser frame includes performing the XOR operation to combine the accent key with at least one HyperText Markup Language (HTML) object name.

8. The method of claim 1, wherein the placing the accent in the browser frame includes performing the XOR operation on X byte groups until reaching an end of a string associated with the at least one script, wherein the end is less than X bytes in length, and masking the accent key to be a same length as the end.

9. The method of claim 1, further comprising generating a look up table in a HyperText Markup Language (HTML) engine, the look up table mapping one or more accent keys that include the accent key to associated domain names including a domain name of the browser frame.

10. The method of claim 1, further comprising generating the accent key prior to calling an invoke member function and an invoke navigation function of a browser.

11. The method of claim 7, further comprising performing a query for the at least one HTML object name in a document object model hosted by the browser frame.

12. The method of claim 1, further comprising generating the accent key after a document object is created for the browser frame.

13. The method of claim 1, further comprising:
    changing the domain of the at least one script to a different domain during execution of the at least one script;
    generating a different accent key; and
    assigning the different accent key to the browser frame, the different accent key being uniquely associated with the different domain.

14. A computing system to implement a transparent defense technique, comprising:
    memory; and
    a processor coupled to the memory, the processor configured to:
        introduce domain specificity to at least one of a script or a HyperText Markup Language (HTML) object name by applying an XOR operation to the at least one of the script or the HTML object name using an accent key that is uniquely associated with a domain of the at least one of the script or the HTML object name, wherein performing the XOR operation using a wrong key results in a meaningless data stream that cannot be compiled; and
        remove the introduced domain specificity from the at least one of the script or the HTML object name, prior to a compiling operation of the script or an HTML object lookup of the HTML object name, by using the accent key that was used to perform the XOR operation.

15. The system of claim 14, wherein the processor is configured to introduce the domain specificity using a random value for the accent key.

16. The system of claim 14, wherein the processor is configured to introduce the domain specificity using a random value or a domain name as the accent key.

17. The system of claim 14, wherein the processor is configured to introduce the domain specificity to the script by performing the XOR operation on four byte groups of the script until reaching an end portion of the script, wherein the end portion is less than four bytes in length, and masking the accent key to be a same length as the end portion.

18. A computer readable storage device storing instructions that cause a processor to perform actions to implement a transparent defense technique, the actions comprising:
    introducing domain specificity to at least one of a script or a HyperText Markup Language (HTML) object name by applying an XOR operation to combine an accent key with the at least one of the script or the HTML object name, the accent key being uniquely assigned to a domain of the at least one of the script or the HTML object name, wherein performing the XOR operation using a wrong key results in a meaningless data stream that cannot be compiled; and removing the introduced domain specificity, prior to a compiling operation of the script or an HTML object lookup of the HTML object name, by using the accent key that was used to perform the XOR operation.

\* \* \* \* \*